United States Patent [19]

Tamura et al.

[11] Patent Number: 4,559,024

[45] Date of Patent: Dec. 17, 1985

[54] VIBRATION DAMPER ASSEMBLY

[75] Inventors: Kazuhisa Tamura; Kazumi Iida; Masahiko Koshimo, all of Osaka, Japan

[73] Assignee: Kabushiki Kaisha Daikin Seisakusho, Osaka, Japan

[21] Appl. No.: 436,804

[22] Filed: Oct. 26, 1982

[30] Foreign Application Priority Data

Oct. 30, 1981 [JP] Japan ................. 56-174726

[51] Int. Cl.$^4$ ............................. F16D 3/66
[52] U.S. Cl. .................. 464/63; 192/106.2; 464/64; 464/68
[58] Field of Search ............. 192/106.2, 70.17; 464/63, 64, 67, 68

[56] References Cited

U.S. PATENT DOCUMENTS

| | | | |
|---|---|---|---|
| 2,284,278 | 5/1942 | Goodwin | 192/106.2 |
| 2,920,733 | 1/1960 | Lysett | 192/106.2 |
| 3,101,600 | 8/1963 | Stromberg | 192/106.2 X |
| 3,266,271 | 8/1966 | Stromberg | 192/106.2 X |
| 4,014,423 | 3/1977 | Werner et al. | 192/106.2 |
| 4,018,320 | 4/1977 | Schrape et al. | 192/106.2 |
| 4,036,341 | 7/1977 | Beeskow et al. | 192/106.2 |
| 4,044,874 | 8/1977 | Worner | 192/106.2 |
| 4,138,003 | 2/1979 | Malloy | 464/64 X |
| 4,223,776 | 9/1980 | Berlioux | 192/106.2 |
| 4,234,068 | 11/1980 | LeBrise | 192/106,2 |
| 4,279,132 | 7/1981 | Lamarche | 464/64 |
| 4,347,717 | 9/1982 | Lamarche | 464/64 |
| 4,378,869 | 4/1983 | Friedmann | 192/106.2 |
| 4,422,535 | 12/1983 | Ling | 192/106.2 X |

FOREIGN PATENT DOCUMENTS 104463 5/1942 Sweden ................. 192/106.2

Primary Examiner—Rodney H. Bonck
Attorney, Agent, or Firm—Armstrong, Nikaido, Marmelstein & Kubovcik

[57] ABSTRACT

A vibration damper assembly, a damper cover being divided into a pair of outer peripheral first covers and a pair of inner peripheral second covers, a first hub being arranged in between said first covers at an input side and the first hub being fixed to the second covers, an output-side second hub being arranged between said second covers, the first covers and the first hub being so coupled that a torque is transmissible between them through the means of a first-stage elastic means, the second covers and the second hub being so coupled that a torque is transmissible between them through the means of a second-stage elastic means, and a friction material being arranged in both or either of between the first covers and the first hub and/or between the second covers and the second hub.

6 Claims, 9 Drawing Figures

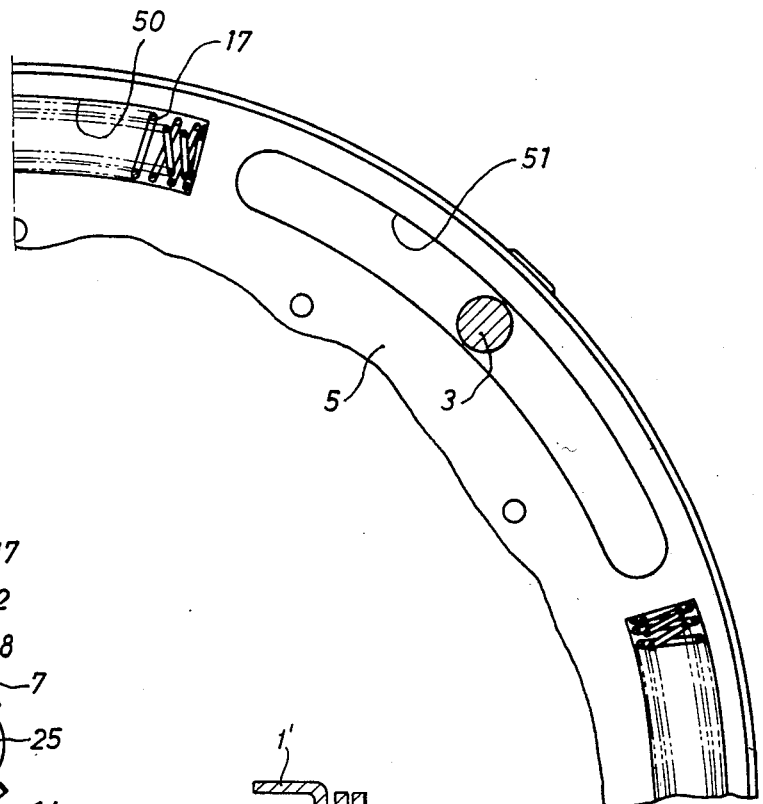
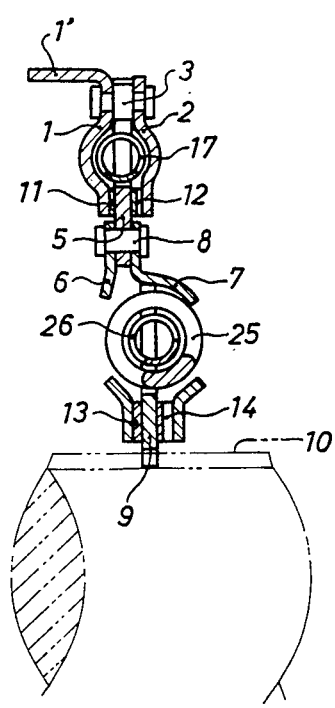
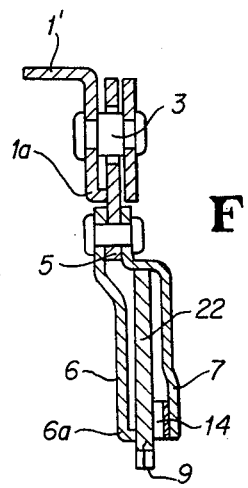

4,559,024

VIBRATION DAMPER ASSEMBLY

BACKGROUND OF THE INVENTION

This invention relates to a vibration damper assembly, and mainly to a vibration damper assembly coupled to a clutch for a manual transmission or to an automobile torque converter having a lock-up clutch for directly-coupled driving.

An object of this invention is to simply and individually set a hysteresis in a range of a small rotating torque within which a first-stage elastic apparatus actuates and a hysteresis in a range of a large rotating torque within which a second-stage elastic apparatus actuates.

In order to accomplish the above object, in this invention; a damper cover is divided into a pair of outer peripheral first covers and a pair of inner peripheral second covers, a first hub is arranged between said first covers at an input side to be fixed to said second covers, an output-side second hub is arranged between said second covers, the first covers and the first hub are so coupled that a torque is transmissible between them through the means of a first-stage elastic means, the second covers and the second hub are so coupled that a torque is transmissible between them through the means of a second-stage elastic means, and a friction material is arranged of between the first covers and the first hub and/or between the second covers and the second hub.

BRIEF DESCRIPTION OF THE DRAWINGS

FIG. 7 is a sectional view taken substantially on the line VII—VII of FIG. 5.

FIG. 8 is a sectional view of another embodiment showing the same sections as FIGS. 1 and 3.

FIG. 9 shows a further embodiment of the invention.

DETAILED DESCRIPTION OF THE INVENTION

Figure 1:
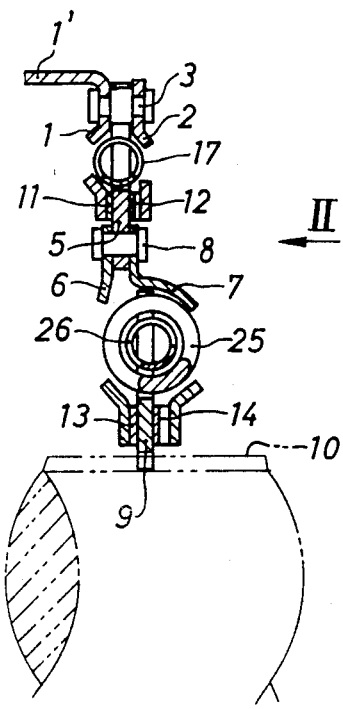
FIG. 1 is an upper half vertical sectional view of the vibration damper assembly in accordance with this invention.

In FIG. 1 showing an upper half vertical sectional view of the vibration damper assembly (taken substantially on the line I—I of FIG. 2), a first main cover 1 at the outer peripheral side (at the upper side of FIG. 1) is connected to a first sub-cover 2 by means of a stop pin 3, a driving plate 1' is formed integrally with the outer peripheral edge of the first main cover 1, and the driving plate 1' is coupled, for example, to a clutch disk or a torque converter provided with a lock-up clutch. An annular first hub 5 is arranged between the first covers 1 and 2, an inner peripheral edge of the first hub 5 is fixed to a second main cover 6 at the inner peripheral side and a second sub-cover 7 by means of a rivet 8. An output-side second hub 9 is arranged between the second covers 6 and 7, said second hub 9 being, for example, spline fitted onto an output shaft 10.

A first paper facing 11 having a low coefficient of friction is arranged between the first hub 5 and the first main cover 1, and a first wave washer 12 is arranged between the first hub 5 and the first sub-cover 2. A second paper facing 13 having a high coefficient of friction is arranged between the second hub 9 and the second main cover 6, and a wave washer 14 is arranged between the second hub 9 and the second sub-cover 7. The first paper facing 11 is bonded to the first main cover 1 or the first hub 5, and the second paper facing 13 is bonded to the second main cover 6 or the second hub 9. The first wave washer 12 and the first paper facing 11 may be omitted depending upon desired driving conditions.

Figure 2:
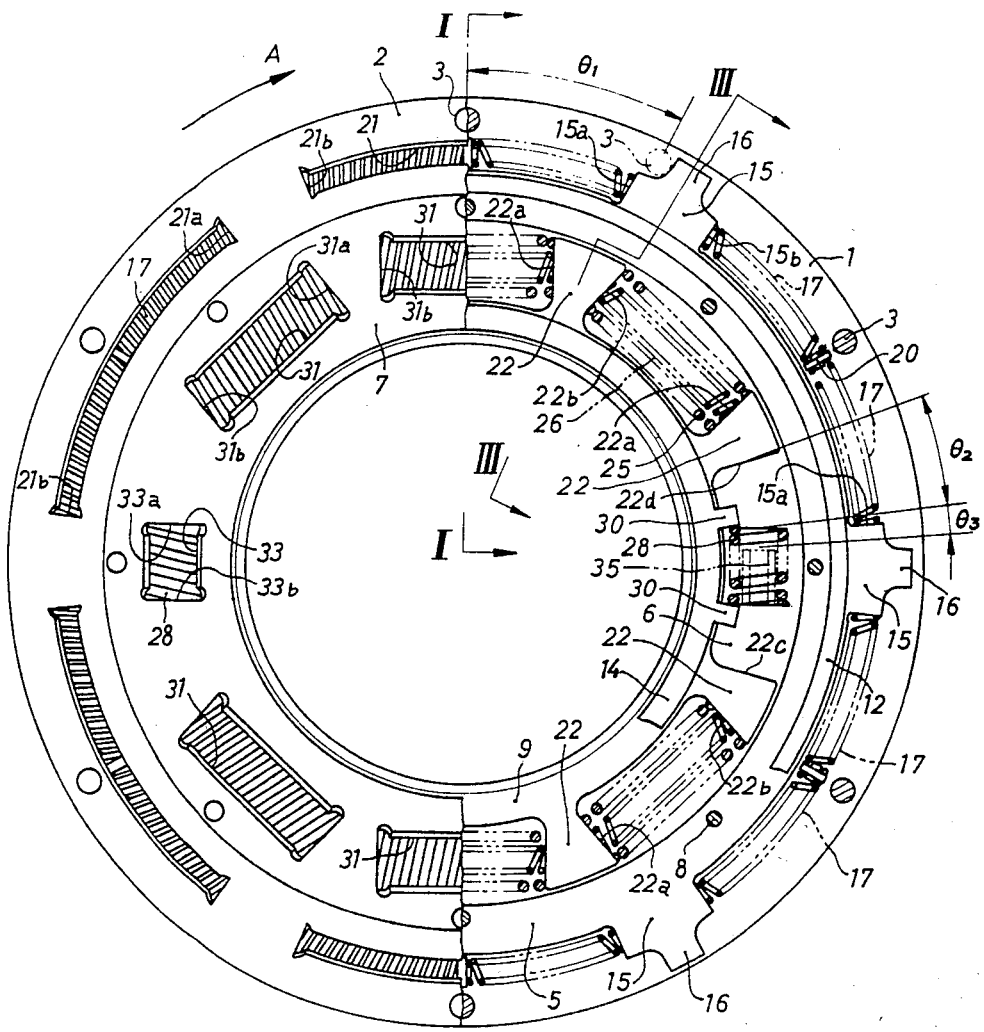
FIG. 2 is a partially fragmental general view looking in the direction of the arrow II in FIG. 1.

FIG. 2 is a general view looking in the direction of the arrow II of FIG. 1, and the right half thereof shows a fragmental view from which the first and second subcovers 2 and 7 are removed. In this FIG. 2, six outward arms 15 are formed on the first hub 5 equally spaced in the circumferential direction, and an outward stopper portion 16 is formed on an outer peripheral edge of each outward arm 15. The stopper portion 16 faces to the stop pins 3 equally spaced in the circumferential direction, each stop pin 3 being positioned at the middle of a circumferential length between stopper portions 16. Two first-stage coil springs 17 are arranged between the outward arms 15 in series in the circumferential direction, and the first-stage coil springs 17 themselves are coupled by means of a floating coupling 20. First window holes 21 are formed on the first covers 1 and 2 corresponding to portions between the outward arms 15, and circumferential edges 21a and 21b of the first window hole 21 contact with both ends of the first-stage coil spring 17.

Eight outward arms 22 are formed on the output-side second hub 9 vertically symmetrically as shown in FIG. 2, circumferential lengths (three places) between opposing edges 22a and 22b of upper half four outward arms 22 are the same respectively; therefore, the circumferential lengths (three places) between opposing edges 22a and 22b of lower half four outward arms 22 are the same as those between the opposing edges 22a and 22b of the upper half four outward arms 22. Lengths between edges 22c and 22d of the outward arms 22 at both right and left portions of FIG. 2 are a little longer than the above-mentioned length between the edges 22a and 22b.

Second-stage double (large and small) coil springs 25 and 26 are arranged respectively in portions between the upper four outward arms 22 and between the lower four outward arms 22 as shown in FIG. 2. Both ends of the second-stage double coil springs 25 and 26 contact with the edges 22a and 22b of the outward arms 22. Short third-stage coil springs 28 are arranged in portions between each of the two outward arms 22 on both the right and left sides in FIG. 2, and both ends of the third-stage coil spring 28 face to the edges 22c and 22d of the outward arms 22 equally spaced in the circumferential direction. Further, the second wave washer 14 is supported by both ends of the third-stage coil spring 28 through a pair (two pairs provided in the entire assembly) of outward projections 30.

Long second window holes 31 are formed respectively on portions of the second covers 6 and 7 corresponding to portions between the outward arms 22, in which the second-stage double coil springs 25 and 26 are arranged, and both edges 31a and 31b of the second window holes 31 contact with both ends of the second-stage double coil springs 25 and 26. Short third window holes 33 are formed on portions of the second covers 6 and 7 corresponding to portions between the outward arms 22, in which the third-stage coil spring 28 is arranged, and both edges 33a and 33b of the third window hole 33 contact with both ends of the third-stage coil spring 28.

Namely, six sets (12 pieces) of the first-stage coil springs 17, six sets of the second-stage double coil springs 25 and 26, and the two third-stage coil springs 28 are assembled in the vibration damper assembly; the second-stage double coil springs 25 and 26 are arranged each three sets vertically symmetrically as shown in FIG. 2, and the third-stage coil springs 28 are arranged each one on either right and left side symmetrically as shown in FIG. 2. The first-stage coil spring 17 has a material diameter and a coil diameter smaller than those of the second-stage double coil spring 25 and the third-stage coil spring 28, and has a spring force smaller than those springs.

Figure 3:
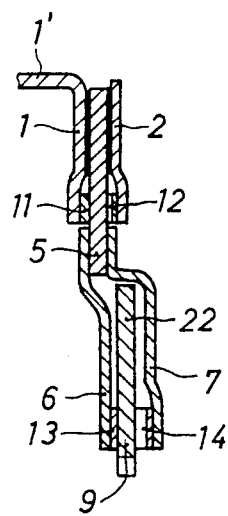
FIG. 3 is a partial sectional view taken substantially on the line III—III of FIG. 2.

FIG. 3 is a partial sectional view taken substantially on the line III—III of FIG. 2, clarifing sectional configurations of the first covers 1 and 2 and the second covers 6 and 7.

The functioning of the vibration damper assembly is as follows. When the first covers 1 and 2 begin rotation in the direction of the arrow A (FIG. 2), a rotational torque is transmitted from the first covers 1 and 2 through the first-stage coil springs 17, the first hub 5, the rivet 8, the second covers 6 and 7, the second-stage double coil springs 25 and 26 and thereby transmitting torque to the second hub 9 of the output side.

With an increase in the rotational torque, the first covers 1 and 2 are rotated in the direction of the arrow A in relation to the first hub 5, and the first-stage coil springs 17 are compressed between an edge 15a of the outward arms 15 facing in the reverse direction of the arrow A and the edge 21b of the first window hole 21 facing in the direction of the arrow A. The first-stage coil springs 17 are compressed until the stop pin 3 contacts with the stopper portion 16 as shown by the imaginary line of FIG. 2; i.e. the first-stage coil springs 17 function within the range of torsional angle $\theta_1$ (0 to 26 degrees).

After the stop pin 3 contacts with the stopper portion 16, the rotational torque is transmitted from the first covers 1 and 2 through the stop pin 3 directly to the first hub 5. When the rotational torque is further increased after the stop pin 3 contacts with the stopper portion 16, the second covers 6 and 7 are rotated in the direction of the arrow A in relation to the second hub 9, and the second-stage double coil springs 25 and 26 are compressed between the edge 22a of the outward arm 22 facing in the reverse direction of the arrow A and the edge 31b of the second window hole 31 facing in the direction of A. When the second-stage coil springs 25 and 26 function within the range of torsional angle $\eta_2$ (26 to 36 degrees), the third-stage coil spring 28 moves together with the outward projection 30 of the second wave washer 14 and the second covers 6 and 7 in the direction of the arrow A in relation to the second hub 9 (without being compressed). Then, an end portion at the side of the arrow A of the third-stage coil spring 28 contacts with the edge 22c of the outward arm 22. After the edge 22c contacts with the end portion at the side of the arrow A of the third-stage coil spring 28, the second-stage double coil springs 25 and 26 together with the third-stage coil spring 28 are compressed. Namely, the third-stage coil spring 28 functions within the range of torsional angle $\theta_3$ (39 to 43 degrees).

The third-stage coil spring 28 may be set so as to be fully compressed in the entire range of torsional angle $\theta_3$. However, in place of the above, a columnar or cylindrical final stopper member 35 may be arranged inside the third-stage coil spring 28, as shown by the imaginary line in FIG. 2, for keeping an end of the stopper member 35 in the reverse direction of the arrow A from the edge 33b of the third window hole 33 with a distance corresponding to the range of torsional angle $\theta_3$.

Figure 4:
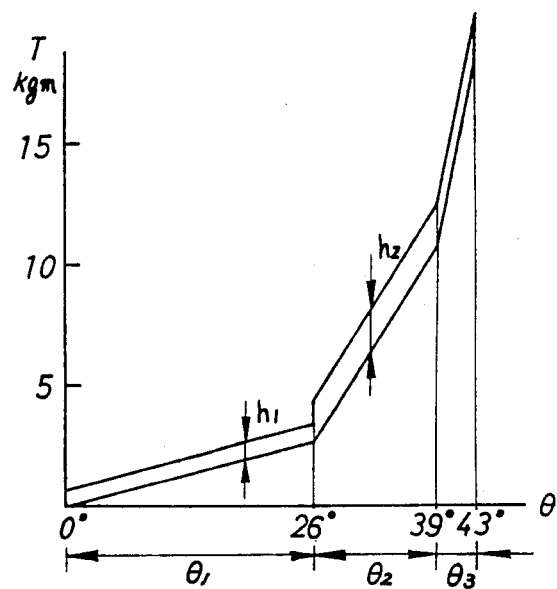
FIG. 4 is a torsional characteristic diagram.

While the first-stage coil springs 17 are functioning ($\theta_1$), its hysteresis is small as shown by $h_1$ in FIG. 4 because the hysteresis is generated by means of friction between the first paper facing 11 having a low coefficient of friction and the first hub 5. While only the second-stage coil springs 25 and 26 are functioning ($\theta_2$), and while the second-stage coil springs 25 and 26 and the third-stage coil spring 28 are functioning ($\theta_3$), its hysteresis is large as shown by $h_2$ in FIG. 4 because the hysteresis is generated by means of friction between the second paper facing 13 having a high coefficient of friction and the second hub 9. In FIG. 4, the axis of abscissa $\theta$ indicates the torsional angle and the axis of ordinate T indicates the rotational torque.

As mentioned above; according to this invention, the damper cover is divided into a pair of first covers 1 and 2 and a pair of second covers 6 and 7, the first hub 5 is arranged between the first covers 1 and 2 at the input side and is fixed to the second covers 6 and 7, the output-side second hub 9 is arranged between the second covers 6 and 7, the first covers 1 and 2 and the first hub 5 are so coupled that a torque is transmissible between them through the means of the first-stage coil springs (first-stage elastic means) 17, the second covers 6 and 7 and the second hub 9 are so coupled that a torque is transmissible between them through the means of the second-stage coil springs (second-stage elastic means) 25 and 26, the friction material (for example, the first paper facing 11) and the first wave washer 12) are arranged between the first covers 1 and 2 and the first hub 5, and the friction material (for example, the second paper facing 13 and the second wave washer 14) are arranged between the second covers 6 and 7 and the second hub 9; so that the following advantages are obtainable:

(1) The hysteresis $h_1$, during functioning ($\theta_1$) of the first-stage coil springs 17, can be set only by the coefficient of friction and shape of the first paper facing 11 and the first wave washer 12. The hysteresis $h_2$, during functioning ($\theta_2$) of the second-stage coil springs 25 and 26, can be set only by the coefficient of friction and shape of the second paper facing 13 and the second wave washer 14. Namely, the hysteresis torques $h_1$ and $h_2$ of each stage can be set to appropriate values simply and correctly because the hysteresis can be generated individually in each stage.

(2) The assembly is so arranged that the first covers 1 and 2 are regarded as the input side and the torque is transmitted from the first covers 1 and 2 to the first hub 5. Therefore, for example, when the stop pin 3 for direct coupling is provided as shown in FIG. 2, stopping function is sufficiently obtainable by only providing the simply-projected stopper portion 16 on the first hub 5, it becomes unnecessary to form a circular-arc-shaped slot etc. for the stop pin to pass through, and manufacturing work becomes easy.

(3) The stop pin 3 is arranged at a peripheral side farther out than an outer peripheral edge of the first-stage coil springs 17 as shown in FIG. 2. Therefore, the first-stage coil springs 17 can be arranged to be circumferentially long, i.e. the distance between the outward arms 15 can be long to provide wide spaces so that the torsional angle can be increased with ease.

Figure 5:
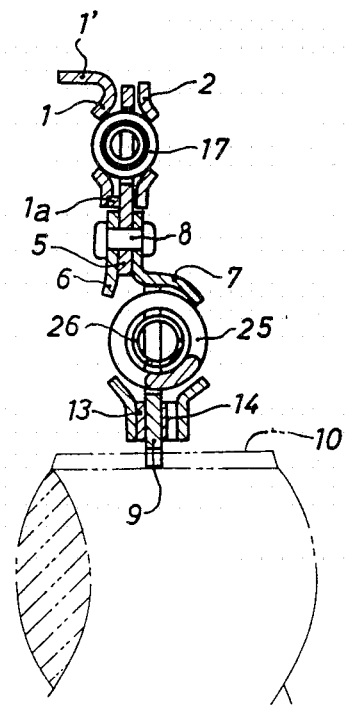
FIGS. 5 and 6 are sectional views of another embodiment showing the same sections as FIGS. 1 and 3.
Figure 6:
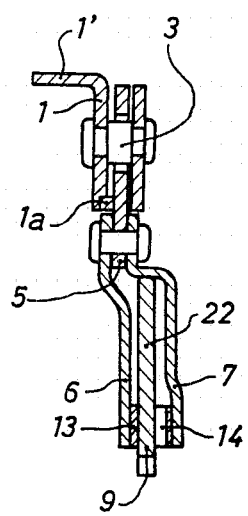

Another embodiment of this invention is shown in FIG. 5 to FIG. 7, in which the shapes of the first covers 1 and 2 and the first hub 5 are different from those of the foregoing embodiment. Since a circumferential passage of the stop pin 3 overlaps with a passage of the first-stage coil springs 17 set in the first hub 5, a hole 50 in which the first-stage coil springs 17 are set and groove holes 51 through which the stop pin 3 passes are arranged on the first hub 5 circumferentially alternately. Further, in this embodiment, the first paper facing 11 and the first wave washer 12 do not exist between the first covers 1 and 2 and the first hub 5; instead, the metal of first main cover 1 is worked to turn the inner peripheral edge inwardly forming a worked projecting portion 1a provided on the first main cover 1 which is guided by the first hub 5 by being in metal to metal contact therewith. A similar worked projecting portion 6a may also be provided on the inner peripheral edge of the second main cover 6, as shown in FIG. 9. The assembly having this configuration is also included in the claim.

Further another embodiment of this invention is shown in FIG. 8, which shows an example applied on a vibration damper assembly having no window hole for coil springs 17 on the first covers 1 and 2, or a so-called enclosed-type vibration damper assembly.

What is claimed is:

1. A vibration damper assembly comprising:
   a driving plate for imparting rotational torque;
   an outer cover means comprising a first main cover formed integrally with said driving plate and a first sub-cover connected to and spaced from said first main cover by a stop pin;
   an annular first hub arranged between said first main cover and said first sub-cover;
   an inner cover means comprising a second main cover and a second sub-cover fixed to opposite sides of the inner periphery of said first hub;
   a second hub arranged between said second main cover and said second sub-cover and fixed to an output shaft for transmitting rotational torque;
   a first-stage elastic means arranged between outward extending arms formed on said first hub and said outer cover means, said outward extending arms having wide spaces therebetween whereby said first stage elastic means may be arranged to be circumferentially long so that the torsion angle can be increased;
   a second-stage elastic means arranged between outward extending arms formed on said second hub and said inner cover means;
   first friction means arranged between said first hub and said first main cover and sub-cover to provide a first hysteresis, and second friction means arranged between said second hub and said second main cover and sub-cover to provide a second hysteresis; and
   a stopper portion extending radially outwardly from the outer peripheral edge of at least one of said outward extending arms formed on said first hub and arranged to engage said stop pin when said outer cover means is rotated with respect to said first hub by rotational torque applied to said driving plate whereby said first stage elastic means acts to provide said first hysteresis over a large torsion angle.

2. A vibration damper assembly as set forth in claim 1 wherein said first and second friction means comprise worked projecting portions formed on said first and second main covers and arranged to be in metal-to-metal contact with said first and second hubs, respectively.

3. A vibration damper assembly as set forth in claim 1 wherein said outer cover means is formed with window holes and said first-stage elastic means is positioned in said window holes.

4. A vibration damper assembly as set forth in claim 1 wherein said outer cover means fully encloses said first-stage elastic means.

5. A vibration damper assembly as set forth in claim 1 wherein said stop pin is positioned at the outer periphery of said outer cover means radially farther out than said first-stage elastic means.

6. A vibration damper assembly as recited in claim 1 wherein said first hysteresis is in a range of a small rotating torque within which said first-stage elastic means actuates in said second hysteresis is in a range of large rotating torque within which said second-stage elastic actuates.

* * * * *